United States Patent
Ziren et al.

(10) Patent No.: US 11,259,225 B2
(45) Date of Patent: Feb. 22, 2022

(54) APPARATUS AND METHOD FOR CELL FREQUENCY CHANGE PROCEDURE SIGNAL TIMING SELECTION

(71) Applicant: Telefonaktiebolaget LM Ericsson (publ), Stockholm (SE)

(72) Inventors: Mikael Ziren, Kavlinge (SE); Peter Alriksson, Horby (SE); Yusheng Liu, Lund (SE); David Sugirtharaj, Lund (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 25 days.

(21) Appl. No.: 15/768,527

(22) PCT Filed: Aug. 18, 2016

(86) PCT No.: PCT/EP2016/069582
§ 371 (c)(1),
(2) Date: Apr. 13, 2018

(87) PCT Pub. No.: WO2017/063778
PCT Pub. Date: Apr. 20, 2017

(65) Prior Publication Data
US 2018/0288663 A1    Oct. 4, 2018

Related U.S. Application Data

(60) Provisional application No. 62/242,576, filed on Oct. 16, 2015.

(51) Int. Cl.
*H04W 36/06* (2009.01)
*H04W 16/14* (2009.01)
(Continued)

(52) U.S. Cl.
CPC ............ *H04W 36/06* (2013.01); *H04W 16/14* (2013.01); *H04W 36/16* (2013.01); *H04W 36/22* (2013.01);
(Continued)

(58) Field of Classification Search
None
See application file for complete search history.

(56) References Cited

U.S. PATENT DOCUMENTS

| | | | |
|---|---|---|---|
| 2003/0129982 A1* | 7/2003 | Perini | H04W 36/18 455/442 |
| 2005/0124344 A1* | 6/2005 | Laroia | H04W 36/18 455/436 |

(Continued)

FOREIGN PATENT DOCUMENTS

| | | |
|---|---|---|
| EP | 2538715 A1 | 12/2012 |
| WO | 2011134099 A1 | 11/2011 |

(Continued)

OTHER PUBLICATIONS

PCT International Search Report, dated Nov. 24, 2016, in connection with International Application No. PCT/EP2016/069582, all pages.

(Continued)

*Primary Examiner* — Ajit Patel
*Assistant Examiner* — Liem H. Nguyen
(74) *Attorney, Agent, or Firm* — Leffler Intellectual Property Law, PLLC

(57) ABSTRACT

A method of a network node for changing a first frequency of a first original cell, wherein one or more wireless communication devices are served by the original cell, and wherein the network node controls a plurality of other cells. The method comprises selecting one or more second frequency of an unlicensed spectrum that the network node (Continued)

should switch the original cell to, determining a second cell on the selected one or more second frequency as target cell and causing the target cell to maintain the same neighbor cell relations as the original cell. The method also comprises moving the one or more wireless communication devices from the original cell to the target cell, turning off the original cell when the one or more wireless communication devices have been moved from the original cell to the target cell and informing one or more neighboring network nodes of the frequency change to the one or more second frequency. Also disclosed is a computer program product, an arrangement and a network node.

20 Claims, 7 Drawing Sheets

(51) Int. Cl.
H04W 36/16 (2009.01)
H04W 36/22 (2009.01)
H04W 76/27 (2018.01)
H04W 36/00 (2009.01)

(52) U.S. Cl.
CPC ........ *H04W 76/27* (2018.02); *H04W 36/0022* (2013.01)

(56) References Cited

U.S. PATENT DOCUMENTS

| | | | | |
|---|---|---|---|---|
| 2006/0166677 A1* | 7/2006 | Derakshan | | H04W 36/14 455/453 |
| 2009/0196213 A1* | 8/2009 | Zhong | | H04W 36/06 370/312 |
| 2010/0234026 A1* | 9/2010 | Tenny | | H04W 36/0061 455/436 |
| 2011/0051692 A1* | 3/2011 | Sambhwani | | H04W 36/0072 370/332 |
| 2011/0250890 A1* | 10/2011 | Chen | | H04W 36/0061 455/436 |
| 2012/0302245 A1* | 11/2012 | Huang | | H04W 36/0027 455/438 |
| 2013/0079009 A1* | 3/2013 | Aumann | | H04W 16/02 455/436 |
| 2013/0114566 A1* | 5/2013 | Awoniyi | | H04W 36/0022 370/331 |
| 2013/0329692 A1* | 12/2013 | Vrzic | | H04W 72/0453 370/329 |
| 2013/0329694 A1* | 12/2013 | Vrzic | | H04W 36/165 370/331 |
| 2014/0198768 A1 | 7/2014 | Hahn et al. | | |
| 2014/0199982 A1 | 7/2014 | Hahn et al. | | |
| 2015/0050941 A1 | 2/2015 | Sawada et al. | | |
| 2015/0131569 A1* | 5/2015 | Rosa | | H04L 1/1671 370/329 |
| 2015/0296387 A1* | 10/2015 | Li | | H04W 16/14 455/454 |
| 2015/0327243 A1* | 11/2015 | Yin | | H04L 5/001 370/329 |
| 2016/0192261 A1* | 6/2016 | Wang | | H04W 36/16 370/331 |
| 2017/0013513 A1* | 1/2017 | Agarwal | | H04W 24/02 |
| 2017/0013519 A1* | 1/2017 | Hahn | | H04W 74/0833 |
| 2017/0215082 A1* | 7/2017 | Hwang | | H04W 28/26 |
| 2017/0311206 A1* | 10/2017 | Ryoo | | H04W 88/02 |

FOREIGN PATENT DOCUMENTS

| | | |
|---|---|---|
| WO | 2012096608 A1 | 7/2012 |
| WO | 2013100828 A1 | 7/2013 |
| WO | 2014000818 A1 | 1/2014 |

OTHER PUBLICATIONS

PCT Written Opinion, dated Nov. 24, 2016, in connection with International Application No. PCT/EP2016/069582, all pages.
3GPP TS 36.300 V13.1.0, Sep. 2015, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13), 254 pages.
Rapeepat Ratasuk et al., "LTE in Unlicensed Spectrum using Licensed-Assistes Access", Globecom 2014 Workshop—Telecommunications Standards—From Research to Standards, Dec. 8, 2014, pp. 746-751.
3GPP TR 36.889 V1.0.0, Jun. 2015, 3rd Generation Partnership Project; Technical Specification Group Radio Access Network; Study on Licensed-Assisted Access to Unlicensed Spectrum; (Release 13), 88 pages.
3GPP TSG-RAN WG2#89bis, R2-151086, Bratislava, Slovakia, Apr. 20-24, 2015, Samsung, LAA SCell Activation and Deactivation, pp. 1-3.
3GPP TSG-RAN WG2 Meeting #89bis, R2-151472, Bratislava, Slovakia, Apr. 24, 2015, PUCCH SCell change, Alcatel-Lucent Shanghai Bell, Alcatel-Lucent, 3 pages.
3GPP TSG RAN WG1 Meeting #80, R1-150194, Athens, Greece, Feb. 9-13, 2015, Channel Selection for LAA, Alcatel-Lucent, Alcatel-Lucent Shanghai Bell, pp. 1-4.
3GPP TS 36.331 v11.5.0, Sep. 2013, 3rd Generation Partnership Project; Technical Specification Group Radio Access Network; Evolved Universal Terrestrial Radio Access (E-UTRA); Radio Resource Control (RRC); Protocol specification Release 11), 347 pages.

* cited by examiner

Cell/TP 1

Cell/TP 2

APPARATUS AND METHOD FOR CELL FREQUENCY CHANGE PROCEDURE SIGNAL TIMING SELECTION

CROSS-REFERENCE TO RELATED APPLICATIONS

This application is a 371 national stage application of PCT/EP2016/069582, filed Aug. 18, 2016, which claims the benefit of U.S. Provisional Application No. 62/242,576, filed Oct. 16, 2015, which are both hereby incorporated herein by reference in their entireties.

TECHNICAL FIELD

The present invention relates generally to the field of wireless communication. More particularly, it relates to channel selection in wireless communication networks.

Background

The 3GPP initiative "License Assisted Access" (LAA) intends to allow LTE (Long Term Evolution) equipment to also operate in the unlicensed radio spectrum such as the 5 GHz band. The unlicensed spectrum is used as a complement to the licensed spectrum. Accordingly, User Equipment (UE) devices connect in the licensed spectrum (primary cell or PCell) and use carrier aggregation to benefit from additional transmission capacity in the unlicensed spectrum (secondary cell or SCell). To reduce the changes required for aggregating licensed and unlicensed spectrum, the LTE frame timing in the primary cell is simultaneously used in the secondary cell.

In addition to LAA operation, it should be possible to run LTE fully on the unlicensed band without the support from the licensed band. This is called LTE-U Stand Alone and one version is standardized in the MulteFire Alliance.

Regulatory requirements, however, may not permit transmissions in the unlicensed spectrum without prior channel sensing. Since the unlicensed spectrum must be shared with other radio devices of similar or dissimilar wireless technologies, a so called listen-before-talk (LBT) method needs to be applied. Today, the unlicensed 5 GHz spectrum is mainly used by equipment implementing the IEEE 802.11 Wireless Local Area Network (WLAN) standard. This standard is known under its marketing brand "Wi-Fi."

The LBT procedure leads to uncertainty at the base station or node (evolved node B, eNB) regarding whether it will be able to transmit (a) DownLink (DL) subframe(s) or not. This leads to a corresponding uncertainty at the UE as to whether it actually has a subframe to decode or not. An analogous uncertainty exists in the UpLink (UL) direction where the eNB is uncertain if the UEs scheduled on the SCell actually made a transmission or not.

LTE uses OFDM (Orthogonal Frequency Division Multiplexing) in the downlink and (Discrete Fourier Transform) DFT-spread OFDM (also referred to as single-carrier Frequency Division Multple Access, FDMA) in the uplink. The basic LTE downlink physical resource can thus be seen as a time-frequency grid as illustrated in FIG. 1, where each resource element 110 corresponds to one OFDM subcarrier during one OFDM symbol interval. The uplink subframe has the same subcarrier spacing as the downlink and the same number of single carrier FDMA (SC-FDMA) symbols in the time domain as OFDM symbols in the downlink. Each OFDM symbol 110 comprises a cycling prefix 120.

In the time domain, LTE downlink transmissions are organized into radio frames of 10 ms, each radio frame consisting of ten equally-sized subframes of length Tsubframe=1 ms as shown in FIG. 2. For normal cyclic prefix, one subframe consists of 14 OFDM symbols. The duration of each symbol is approximately 71.4 μm.

Furthermore, the resource allocation in LTE is typically described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

Downlink transmissions are dynamically scheduled, i.e., in each subframe the base station transmits control information about which terminal(s) data is transmitted to and upon which resource blocks the data is transmitted, in the current downlink subframe. This control signaling is typically transmitted in the first 1, 2, 3 or 4 OFDM symbols in each subframe and the number n=1, 2, 3 or 4 is known as the Control Format Indicator (CFI). The downlink subframe also contains common reference symbols, which are known to the receiver and used for coherent demodulation of e.g. the control information. A downlink system with CFI=3 OFDM symbols as control is illustrated in FIG. 3

From LTE Rel-11 and onwards, above described resource assignments can also be scheduled on the enhanced Physical Downlink Control Channel (ePDCCH). For Rel-8 to Rel-10 only Physical Downlink Control Channel (PDCCH) is available.

The reference symbols shown in FIG. 3 are the cell specific reference symbols (CRS) and are used to support multiple functions including fine time and frequency synchronization and channel estimation for certain transmission modes.

The PDCCH/ePDCCH is used to carry downlink control information (DCI) such as scheduling decisions and power-control commands. More specifically, the DCI includes:

Downlink scheduling assignments, including PDSCH resource indication, transport format, hybrid-ARQ information, and control information related to spatial multiplexing (if applicable). A downlink scheduling assignment also includes a command for power control of the PUCCH used for transmission of hybrid-ARQ acknowledgements in response to downlink scheduling assignments.

Uplink scheduling grants, including PUSCH resource indication, transport format, and hybrid-ARQ (automatic repeat request)-related information. An uplink scheduling grant also includes a command for power control of the PUSCH.

Power-control commands for a set of terminals as a complement to the commands included in the scheduling assignments/grants.

One PDCCH/ePDCCH carries one DCI message containing one of the groups of information listed above. As multiple terminals can be scheduled simultaneously, and each terminal can be scheduled on both downlink and uplink simultaneously, there must be a possibility to transmit multiple scheduling messages within each subframe. Each scheduling message is transmitted on separate PDCCH/ePDCCH resources, and consequently there are typically multiple simultaneous PDCCH/ePDCCH transmissions within each subframe in each cell. Furthermore, to support different radio-channel conditions, link adaptation can be used, where the code rate of the PDCCH/ePDCCH is selected by adapting the resource usage for the PDCCH/ePDCCH, to match the radio-channel conditions.

Here follows a discussion on the start symbol for PDSCH and ePDCCH within the subframe. The OFDM symbols in the first slot are numbered from 0 to 6. For transmissions modes 1-9, the starting OFDM symbol in the first slot of the subframe for ePDCCH can be configured by higher layer signaling and the same is used for the corresponding scheduled PDSCH. Both sets have the same ePDCCH starting symbol for these transmission modes. If not configured by higher layers, the start symbol for both PDSCH and ePDCCH is given by the CFI value signaled in physical control format indicator channel (PCFICH).

Multiple OFDM starting symbol candidates can be achieved by configuring the user equipment (UE) in transmission mode 10, by having multiple ePDCCH PRB configuration sets where for each set the starting OFDM symbol in the first slot in a subframe for ePDCCH can be configured by higher layers to be a value from {1,2,3,4}, independently for each ePDCCH set. If a set is not higher layer configured to have a fixed start symbol, then the ePDCCH start symbol for this set follows the CFI value received in PCFICH.

The LTE Rel-10 standard supports bandwidths larger than 20 MHz. One important requirement on LTE Rel-10 is to assure backward compatibility with LTE Rel-8. This should also include spectrum compatibility. That would imply that an LTE Rel-10 carrier, wider than 20 MHz, should appear as a number of LTE carriers to an LTE Rel-8 terminal. Each such carrier can be referred to as a Component Carrier (CC). In particular for early LTE Rel-10 deployments it can be expected that there will be a smaller number of LTE Rel-10-capable terminals compared to many LTE legacy terminals. Therefore, it is necessary to assure an efficient use of a wide carrier also for legacy terminals, i.e. that it is possible to implement carriers where legacy terminals can be scheduled in all parts of the wideband LTE Rel-10 carrier. The straightforward way to obtain this would be by means of Carrier Aggregation (CA). CA implies that an LTE Rel-10 terminal can receive multiple CC, where the CC have, or at least the possibility to have, the same structure as a Rel-8 carrier. CA is illustrated in FIG. 4. A CA-capable UE is assigned a primary cell (PCell) which is always activated, and one or more secondary cells (SCells) which may be activated or deactivated dynamically.

The number of aggregated CC as well as the bandwidth of the individual CC may be different for uplink and downlink. A symmetric configuration refers to the case where the number of CCs in downlink and uplink is the same whereas an asymmetric configuration refers to the case that the number of CCs is different. It is important to note that the number of CCs configured in a cell may be different from the number of CCs seen by a terminal: A terminal may for example support more downlink CCs than uplink CCs, even though the cell is configured with the same number of uplink and downlink CCs.

In addition, a key feature of carrier aggregation is the ability to perform cross-carrier scheduling. This mechanism allows a (e)PDCCH on one CC to schedule data transmissions on another CC by means of a 3-bit Carrier Indicator Field (CIF) inserted at the beginning of the (e)PDCCH messages. For data transmissions on a given CC, a UE expects to receive scheduling messages on the (e)PDCCH on just one CC—either the same CC, or a different CC via cross-carrier scheduling; this mapping from (e)PDCCH to PDSCH is also configured semi-statically.

This UE performs periodic cell search and received signal received power (RSRP) and received signal received quality (RSRQ) measurements in radio resource control (RRC) Connected mode. It is responsible for detecting new neighbor cells, and for tracking and monitoring already detected cells. The detected cells and the associated measurement values are reported to the network. Reports to the network can be configured to be periodic or aperiodic based a particular event.

To share the channel in the unlicensed spectrum, the LAA SCell cannot occupy the channel indefinitely. One of the mechanisms for interference avoidance and coordination among small cells is SCell ON/OFF feature. In Rel-12 LTE, discovery signals were introduced to provide enhanced support for SCell ON/OFF operations. Specifically, these signals are introduced to handle potentially severe interference situations (particularly on the synchronization signals) resulting from dense deployment as well as to reduce UE inter-frequency measurement complexity.

The discovery signals in a discovery reference signal (DRS) occasion are comprised of the primary synchronization signal (PSS), secondary synchronization signal (SSS), common reference signal (CRS) and when configured, the channel state information reference signals (CSI-RS). The PSS and SSS are used for coarse synchronization, when needed, and for cell identification. The CRS is used for fine time and frequency estimation and tracking and may also be used for cell validation, i.e., to confirm the cell ID detected from the PSS and SSS. The CSI-RS is another signal that can be used in dense deployments for cell or transmission point identification. FIG. 5 shows the presence of these signals in a DRS occasion of length equal to two subframes and also shows the transmission of the signals over two different cells or transmission points. FIG. 5 hence shows the LTE time-frequency structure.

The DRS occasion corresponding to transmissions from a particular cell may range in duration from one to five subframes for frequency division duplex (FDD) and two to five subframes for time division duplex (TDD). The subframe in which the SSS occurs marks the starting subframe of the DRS occasion. This subframe is either subframe 0 or subframe 5 in both FDD and TDD. In TDD, the PSS appears in subframe 1 and subframe 6 while in FDD the PSS appears in the same subframe as the SSS. The CRS are transmitted in all downlink subframes and downlink pilot time slot (DwPTS) regions of special subframes.

The discovery signals should be useable by the UE for performing cell identification, reference signal received power (RSRP) and reference signal received quality (RSRQ) measurements. The RSRP measurement definition based on discovery signals is the same as in prior releases of LTE. The RSSI measurement is defined as an average over all OFDM symbols in the downlink parts of the measured subframes within a DRS occasion. The RSRQ is then defined as

DRSRQ=N×DRSRP/DRSSI, where N is the number of PRBs used in performing the measurement, DRSRP is the RSRP measurement based on the discovery signals and DRSSI is the RSSI measured over the DRS occasion.

In Rel-12, RSRP measurements based on the CRS and CSI-RS in the DRS occasions and RSRQ measurements based on the CRS in the DRS occasions have been defined. As stated earlier, discovery signals can be used in a small cell deployment where the cells are being turned off and on or in a general deployment where the on/off feature is not being used. For instance, discovery signals could be used to make RSRP measurements on different CSI-RS configurations in the DRS occasion being used within a cell, which enables the detection of different transmission points in a shared cell.

When measurements are made on the CSI-RS in a DRS occasion, the UE restricts its measurements to a list of candidates sent to the UE by the network via RRC signaling. Each candidate in this list contains a physical cell ID (PCID), a virtual cell ID (VCID) and a subframe offset indicating the duration (in number of subframes) between the subframe where the UE receives the CSI-RS and the subframe carrying the SSS. This information allows the UE to limit its search. The UE correlates to the received signal candidates indicated by the RRC signal and reports back any CSI-RS RSRP values that have been found to meet some reporting criterion, e.g., exceeding a threshold value.

When a UE is being served on multiple carrier frequencies via a PCell and one or more SCells, the UE needs to perform RRM measurements on other cells on the currently used carrier frequencies (intra-frequency measurements) as well as on cells on other carrier frequencies (inter-frequency measurements). Since the discovery signals are not transmitted continuously, the UE needs to be informed about the timing of the discovery signals so as to manage its search complexity. Furthermore, when a UE is being served on as many carrier frequencies as it is capable of supporting and inter-frequency radio resource management (RRM) measurements need to be performed on a different carrier frequency that is not currently being used, the UE is assigned a measurement gap pattern. This gap pattern on a serving frequency allows the UE to retune its receiver for that frequency to the other frequency on which measurements are being performed. During this gap duration, the UE cannot be scheduled by the eNB on the current serving frequency. Knowledge of the timing of the discovery signals is especially important when the use of such measurement gaps is needed. Beyond mitigating UE complexity, this also ensures that the UE is not unavailable for scheduling for prolonged periods of time on the current serving frequencies (PCell or SCell).

The provision of such timing information is done via a discovery measurement timing configuration (DMTC) that is signaled to the UE. The DMTC provides a window with a duration of 6 ms occurring with a certain periodicity and timing within which the UE may expect to receive discovery signals. The duration of 6 ms is the same as the measurement gap duration as defined currently in LTE and allows the measurement procedures at the UE for discovery signals to be harmonized regardless of the need for measurement gaps. Only one DMTC is provided per carrier frequency including the current serving frequencies. The UE can expect that the network will transmit discovery signals so that all cells that are intended to be discoverable on a carrier frequency transmit discovery signals within the DMTCs. Furthermore, when measurement gaps are needed, it is expected that the network will ensure sufficient overlap between the configured DMTCs and measurement gaps.

Turning to Wireless Local Area Networks, in typical deployments of WLAN, carrier sense multiple access with collision avoidance (CSMA/CA) is used for medium access. This means that the channel is sensed to perform a clear channel assessment (CCA), and a transmission is initiated only if the channel is declared as Idle. In case the channel is declared as Busy, the transmission is essentially deferred until the channel is deemed to be Idle. When the range of several APs using the same frequency overlap, this means that all transmissions related to one AP might be deferred in case a transmission on the same frequency to or from another AP which is within range can be detected. Effectively, this means that if several APs are within range, they will have to share the channel in time, and the throughput for the individual APs may be severely degraded. A general illustration of the listen before talk (LBT) mechanism is shown in FIG. 6.

As there is a large available bandwidth of unlicensed spectrum, carrier selection is required for license assisted access (LAA) nodes to select the carriers with low interference and with that achieve good co-existence with other unlicensed spectrum deployments. For any technology, when deploying an additional node, the first rule for achieving high-performance for the new node itself as well as for the existing nodes is to scan the available channels and select one that would receive least interference for the node itself and cause least interference to existing nodes.

The basic principle behind carrier selection is for the eNB to scan and sense channels for interference or radar detection, and configure the SCell frequency accordingly based on the outcome of its carrier selection algorithm. The carrier selection process is separate and on a different time scale from the LBT/CCA procedure prior to transmissions on the unlicensed channels. It is expensive to move all attached UEs to another carrier frequency due to the signaling required and interruptions in the data flow.

Autonomous, semi-static carrier selection can be based on the eNB sensing of the averaged interference level, potential presence of radar signals if required, and traffic load on the candidate carriers over a relatively longer time scale. Once a suitable set of carriers is identified, they are added and activated as SCells for UEs. This process may be repeated periodically over tens or hundreds of milliseconds in order to keep reassessing the interference environment, and the associated measurements do not need any new specifications. Once a set of carriers is activated after the carrier selection process, transmissions can be performed dynamically on one or more of them based on LBT and fast discontinuous transmission (DTX).

For Licensed assisted access (LAA) to unlicensed spectrum using LTE, up to now, the spectrum used by LTE is dedicated to LTE. This has the advantage that LTE system does not need to care about the coexistence issue and the spectrum efficiency can be maximized. However, the spectrum allocated to LTE is limited which cannot meet the ever increasing demand for larger throughput from applications/services. Therefore, a new study item has been initiated in 3GPP on extending LTE to exploit unlicensed spectrum in addition to licensed spectrum. Unlicensed spectrum can, by definition, be simultaneously used by multiple different technologies. Therefore, LTE needs to consider the coexistence issue with other systems such as IEEE 802.11 (Wi-Fi). Operating LTE in the same manner in unlicensed spectrum as in licensed spectrum can seriously degrade the performance of Wi-Fi as Wi-Fi will not transmit once it detects that the channel is occupied.

Furthermore, one way to utilize the unlicensed spectrum reliably is to transmit essential control signals and channels on a licensed carrier. That is, as shown in FIG. 7, a UE is connected to a Primary Cell, PCell, in the licensed band and one or more Secondary Cells, SCells, in the unlicensed band. In this application we denote a secondary cell in unlicensed spectrum as license assisted secondary cell (LA SCell).

Recently there have also been proposals to operate LTE in unlicensed spectrum without the aid of a licensed carrier. In such an operation, the PCell will also operate on the unlicensed carrier and thus essential control signals and channels will also be subject to unmanaged interference and CCA.

Furthermore, the carrier (re)selection process (when the network node changes its carrier frequency during operation) becomes more problematic when it is also applied to the PCell (or serving cell in IDLE), because then there is no cell that the UE is "anchored" to during the carrier frequency change.

In UMTS 3GPP specifications, there is an optional field in many reconfiguration messages indicating activation time. This is used to synchronize NodeB and UE switch of physical configuration, and for handover messages.

The activation time concept is not needed in LTE specifications due to that physical channel reconfiguration is dynamically changed and informed to the UE every sub frame in the DCI.

As part of the startup procedure of a new cell in unlicensed spectrum, the eNB needs to select one frequency (channel) in the band to operate on. Ideally the eNB should select the channel with the lowest traffic load/interference. This selection can e.g. be based on RSSI measurements over all available channels picking the one with lowest RSSI.

As the interference situation will change over time, there is a need to continuously monitor the channels and re-select to a better one with lower load/interference.

In particular, for the 3.5 GHz band in US, there might be other systems operating in the band with higher priority. If such systems start operating, the eNB needs to move to another free channel.

The LTE specifications are made for licensed bands where the operators have a licensed spectrum to use for the cells which never change. Therefore, 3GPP has not defined any procedure for changing frequency of an eNB.

It is believed that for operation in unlicensed spectrum the cell frequency change will need to be done relatively often.

To minimize user disruption, the channel re-selection procedure is typically done during low traffic hours. This has the additional problem that the channel measurements made then do not give a representative view of the load/interference situation during busy hours when the channel selection is most critical.

The obvious solution for changing the frequency is to shut off the cell and turn it on again at the new frequency. But this has a lot of drawbacks. All the UEs attached to it will lose the connection and need to search for a new cell which may not be there for some time if the startup time of the cell is long.

Therefore, there is a need for methods, and arrangements for changing the frequency without suffering from the problems mentioned above.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

The core essence of this invention is to design a method, and an arrangement to implement the method, to switch the frequency of a cell operating on unlicensed spectrum or lightly licensed spectrum which has the advantages that it has a low impact on user experience and also a low impact on system complexity.

A lightly licensed spectrum may e.g. be a spectrum where some frequencies are under license for use, and others are not.

It is therefore an object to provide a method implemented in a network node for changing the frequency of a cell comprising the steps of determining a target frequency, providing a cell on the target frequency, move wireless devices from the original frequency to the target frequency, turn off the cell on the original frequency and inform neighbor cells about the frequency change.

In one embodiment an arrangement, such as a node, comprises means to turn on a new cell.

In one embodiment an arrangement, such as a node, comprises means to reconfigure an already existing cell.

In one embodiment an arrangement, such as a node, comprises means to inform the wireless device using dedicated signaling.

In one embodiment an arrangement, such as a node, comprises dedicated signaling means to perform a hand over.

In one embodiment an arrangement, such as a node, comprises dedicated signaling means to perform a connect release with re-direct.

In one embodiment an arrangement, such as a node, the move means are also for informing the wireless device using broadcast and paging messages.

In one embodiment an activation time is used, within which the frequency change is to be accomplished.

It is an object of some embodiments to obviate at least some of the above disadvantages and to provide a method and an arrangement.

According to a first aspect this is achieved by a method.

The method according to the first aspect may be a method of a network node for changing the frequency of a first original cell. The original cell operates at a first frequency, and one or more wireless communication devices are served by the original cell. The network node controls a plurality of other cells.

The method comprises selecting one or more second frequency of an unlicensed spectrum that the network node should switch the original cell to and determining a second cell on the selected one or more second frequency as target cell.

The method also comprises causing the target cell to maintain the same neighbor cell relations as the original cell, moving the one or more wireless communication devices from the original cell to the target cell and turning off the original cell when the one or more wireless communication devices have been moved from the original cell to the target cell.

The method also comprises causing the one or more wireless communication devices to complete a handover procedure on the target cell and informing one or more neighboring network nodes of the frequency change to the selected one or more second frequency.

The network node may in some embodiments cause the target cell to maintain the same neighbor relations as the original cell by configuring the target cell with the same parameters as the original cell. For instance, the target cell may receive the same network parameters, the same cell ID and/or the same neighbor list as the original cell.

In some embodiments, the network node informs neighboring network nodes that may have a connection to the original cell, so that the neighboring network nodes may configure their own cells according to the frequency change. I.e., if another cell has a relation to the original cell, then the other cell should be informed that the original cell has changed frequency and possibly cell ID.

In some embodiments, the determining the target cell may comprise determining if there are other active cells among the plurality of other cells controlled by the network node that can continue to be operated with, i.e. determine if other active cells are still functioning properly and thus still may be kept turned on, and if so, selecting one or more such active cells as target cell.

In some embodiments, determining the second cell on the selected one or more second frequency may comprise determining if the network node controls a maximum number of cells. If such is the case, the method may comprise moving the one or more wireless communication device from the original cell to one or more of the plurality of other cells and turning off the original cell. The method may further comprise determining the target cell on the selected one or more second frequency by creating a new cell operating in the selected one or more second frequency and moving the one or more wireless communication device from one or more of the plurality of other cells to the target cell.

In some embodiments, determining the second cell on the selected one or more second frequency may comprise determining if the network node controls a maximum number of cells, and that all cells need to be turned off. If so, the method may comprise moving the one or more wireless communication device from the first cell to one or more of the plurality of other cells, turning off the original cell, determining the target cell on the selected second frequency by creating a new cell operating in the selected second frequency and moving the one or more wireless communication device from the neighboring cells to the target cell and turning off the one or more of the plurality of other cells.

In some embodiments, the method may further comprise determining if there is a sufficient amount of free capacity to create the target cell. If so, the method may comprise creating the target cell, and refraining from turning off the first cell until the target cell is created.

In some embodiments, moving the one or more wireless communication device from the original cell may comprise determining if the one or more wireless communication device is in Radio Resource Control—RRC—Connected state and uses the original cell as Primary Cell, and if so, performing a handover or a release by re-directing the one or more wireless communication device from the original cell to the target cell.

In some embodiments, the method may further comprise determining if the one or more wireless communication device is in RRC Idle state and uses the first cell as serving cell. If so, the method may further comprise paging the one or more wireless communication device to force it to RRC Connected state and then moving the one or more wireless communication device from the first cell by determining if the one or more wireless communication device is in RRC Connected state and uses the first cell as Primary Cell.

If so, the method may further comprise performing handover or a release by re-directing the one or more wireless communication device from the original cell to the target cell.

In some embodiments, the method may further comprise determining if the one or more wireless communication device is in RRC Idle state and uses the original cell as serving cell. If so, the method may further comprise moving the one or more wireless communication device while in RRC IDLE state through the steps of:

updating a system information in the original cell with at least one of the target cell's frequency as a neighbor frequency (SIB5), information that the original cell is barred (SIB1) and information that intra-frequency cell reselection is not allowed (SIB1) and paging the one or more wireless communication device to re-read the system information of the original cell.

In some embodiments, the method may further comprise determining if the one or more wireless communication device is in RRC IDLE state and uses the original cell as serving cell, and if so, the method may comprise moving the wireless communication device while in RRC IDLE state using new signaling through at least one of dedicated paging messages and broadcast information.

In some embodiments, the method may further comprise determining if the one or more wireless communication device is in RRC Connected state and uses the original cell as Secondary Cell, and if so the method may comprise releasing the one or more wireless communication device from the original cell and configuring the target cell as new Secondary Cell.

A second aspect is a computer program product comprising a computer readable medium, having thereon a computer program comprising program instructions, the computer program being loadable into a data-processing unit and adapted to cause execution of the method according to the first aspect when the computer program is run by the data-processing unit.

According to a third aspect this is achieved by an arrangement, such as a eNB.

The arrangement according to the third aspect may e.g. be of a network node and the arrangement comprises a controller, for changing a frequency of a first original cell. The original cell is configured to operate at a first frequency, and one or more wireless communication devices are served by the original cell. The network node is configured to control a plurality of other cells.

The controller is configured to cause the network node to select one or more second frequency on an unlicensed spectrum that the original cell should switch to, determine a second cell on the selected one or more second frequency as target cell and cause the target cell to maintain the same neighbor cell relations as the original cell.

The controller is also configured to cause movement of the one or more wireless communication devices from the original cell to the target cell, turn off the original cell when the one or more wireless communication device have been moved from the original cell to the target cell, and inform one or more neighboring network node of the frequency change to the selected one or more second frequency.

In some embodiments, the arrangement may further comprise means to turn on a new cell.

In some embodiments, the arrangement may further comprise means to reconfigure an already existing cell.

In some embodiments, the controller is further configured to inform the wireless device by means of dedicated signaling.

In some embodiments, the arrangement may further comprise dedicated signaling means configured to perform a hand over.

In some embodiments, the arrangement may further comprise dedicated signaling means to perform a connect release with re-direct.

In some embodiments, the controller may further be configured to inform the wireless device using broadcast and paging messages.

In some embodiments, the controller is configured to cause the determination of the target cell by causing determination of whether there are other active cells among the plurality of other cells controlled by the network node that can continue to be operated with. If such is the case the controller may cause determination of the target cell by selecting one or more such active cells as target cell.

In some embodiments, the controller is further configured to cause determination of the target cell by causing the determination of whether the network node controls a maximum number of cells. If such is the case moving of the one or more wireless communication device from the original cell to one or more of the plurality of other cells and turning off of the original cell. The controller may further cause determination of the target cell on the selected one or more second frequency by creating a new cell operating in the selected one or more second frequency and moving the one or more wireless communication device from the plurality of other cells to the target cell.

In some embodiments, the controller is further configured to cause determination of the target cell by causing the determination of whether the network node controls a maximum number of cells, and that all cells needs to be turned off. If such is the case, the controller may cause the move of the one or more wireless communication device from the original cell to one or more of the plurality of other cells, and the turning off of the original cell. The controller may further cause determination of the target cell on the selected one or more second frequency by creating a new cell operating in the selected one or more second frequency and moving the one or more wireless communication device from the plurality of other cells to the target cell and turning off the plurality of other cells.

In some embodiments, the controller is further configured to cause determination of whether there is a sufficient amount of free capacity to create the target cell. If such is the case, the controller may cause creation of the target cell; and refraining from turning off the original cell until the target cell is created.

In some embodiments, the controller is further configured to cause moving of the one or more wireless communication device from the original cell by causing determination of whether the one or more wireless communication device is in Radio Resource Control—RRC—Connected state and uses the original cell as Primary Cell. If such is the case the controller may further cause performing of a handover or a release by re-directing the one or more wireless communication device from the original cell to the target cell.

In some embodiments, the controller is further configured to cause determination of whether the one or more wireless communication device is in RRC Connected state and uses the original cell as Secondary Cell. If such is the case, the controller may cause release of the one or more wireless communication device from the original cell and configuration of the target cell as new Secondary Cell.

In some embodiments, the controller is further configured to cause determination of whether the one or more wireless communication device is in RRC Idle state and uses the original cell as serving cell. If such is the case the controller may further cause paging of the one or more wireless communication device to force it to RRC Connected state and then moving of the one or more wireless communication device from the original cell by causing determination of whether the one or more wireless communication device is in RRC Connected state and uses the original cell as Primary Cell. If such is the case, the controller may cause performing of handover or a release by re-directing the one or more wireless communication device from the original cell to the target cell.

In some embodiments, the controller is further configured to cause determination of whether the one or more wireless communication device is in RRC Idle state and uses the original cell as serving cell. If such is the case, the controller may further cause moving of the one or more wireless communication device while in RRC IDLE state through by causing update of a system information in the original cell with the target cell's frequency as a neighbor frequency (SIB5), information that the original cell is barred (SIB1) and/or information that intra-frequency cell reselection is not allowed (SIB1). The controller is also configured to cause paging of the one or more wireless communication device to re-read the system information of the original cell.

In some embodiments, the controller is further configured to cause determination of whether the one or more wireless communication device is in RRC IDLE state and uses the original cell as serving cell. If such is the case, the controller may cause moving of the wireless communication device while in RRC IDLE state through at least one of dedicated paging messages and broadcast information.

A fourth aspect is a network node comprising the arrangement according to the third aspect.

In some embodiments, the third and fourth aspect may additionally share or have identical features as those of the first aspect.

The methods and apparati disclosed herein solves the drawbacks discussed in the background section by using currently available LTE procedures in a new way to first move away all users to other cells before shutting off the cell.

The proposed solution is that instead of turning off and on the cell, first move all users to another target cell within the same eNB, then turn off the original source cell when no users are attached to it. If the eNB does not already have another cell configured, it will select a suitable frequency on unlicensed spectrum and starts a new cell as target cell in order to move all users from the original cell. The prerequisite for the solution is that the eNB is supporting more than one cell, which is the normal case.

An alternative proposed solution is to utilize the activation time concept (prior art) in a new context to turn off the cell without needing to wait for the new cell to be active. The activation time needs to be far enough in the future in order to give time for the eNB to turn off the old cell and start a new cell. This however requires modification to the LTE handover procedures.

This alternative solution may be achieved according to a fifth aspect.

The fifth aspect may e.g. be a method of a network node for changing a first frequency of a first original cell, and wherein the network node controls a plurality of other cells. The original cell is serving one or more wireless communication devices. The method comprises selecting one or more second frequency of an unlicensed spectrum that the network node should switch the original cell to and determining a second cell on the selected one or more second frequency as target cell.

The method also comprises causing the target cell to maintain the same neighbor cell relations as the original cell and performing a handover or a release by re-directing the one or more wireless communication device from the original cell to the target cell, wherein the handover comprises handover message comprising an activation time to the one or more wireless communication device.

The activation time may denote when in time the target cell will be turned on and be ready to receive the one or more wireless communication devices.

The method also comprises turning off the original cell and turning on the target cell on the selected second frequency before the activation time expires and informing one or more neighboring network nodes of the frequency change to the second frequency.

In some embodiments, the method may further comprise determining if the one or more wireless communication device is in RRC Connected state and uses the original cell as Primary Cell. If such is the case the method may further comprise performing handover of the one or more wireless communication device from the original cell to the target cell, wherein the hand over comprises a handover message comprising an activation time indicating when in time the target cell is available for the one or more wireless communication device and wherein the network node deactivates the original cell, and activates the target cell on the selected second frequency before expiration of the activation time.

In some embodiments, the method may further comprise determining if the one or more wireless communication device is in RRC Idle state and uses the original cell as serving cell, and if so, paging the one or more wireless communication device to force it to RRC Connected state and determining if the one or more wireless communication device is in RRC Connected state and uses the original cell as Primary Cell. If such is the case, the method may further comprise performing handover or a release by re-directing the one or more wireless communication device from the original cell to the target cell within the activation time.

A sixth aspect is an arrangement of a network node for changing a first frequency of a first original cell, wherein the network node controls a plurality of other cells. The arrangement comprises a controller configured to cause selection of one or more second frequency of an unlicensed spectrum that the network node should switch the original cell to and determining a second cell on the selected second frequency as target cell. The original cell serves one or more wireless communication devices.

The controller is also configured to cause the target cell to maintain the same neighbor cell relations as the original cell and performing a handover or a release by re-directing the one or more wireless communication device from the original cell to the target cell, wherein the handover comprises handover message comprising an activation time to the one or more wireless communication device.

The controller is also configured to cause the network node to turn off the original cell and turning on the target cell on the selected second frequency before the activation time expires and informing one or more neighboring network nodes of the frequency change to the second frequency.

In some embodiments, controller may further be configured to cause the turning off of the original cell on the first frequency and the turning on of the original cell on the second frequency within the activation time.

In some embodiments, the sixth aspect may additionally share or have identical features as those described for the fifth aspect.

In some embodiments, the fifth and sixth aspects may additionally share or have identical features as those described for any of the first, third or fourth aspect.

The solution(s) taught herein bring about the following advantages: the eNB can reconfigure the frequency without significant impact of user experience; the UE's RRC connection is maintained even if the serving cell is turned off; there is no need to synchronize the startup of the new cell with the UE; there is no time restriction on how long the procedure takes; a frequency change can be afforded to be made more often to better follow interference fluctuation; and there is a low impact on system complexity. This is possible since there always is a cell which the UEs may connect to. In the event that it is not possible to create a new cell, the use of an activation time may still keep efficiency in the network high.

BRIEF DESCRIPTION OF THE DRAWINGS

Further objects, features and advantages will appear from the following detailed description of embodiments, with reference being made to the accompanying drawings, in which.

DETAILED DESCRIPTION

In the following, embodiments will be described. In the described embodiments reconfiguration of cell frequency is enabled without negatively affect user experience or network performance. The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as a wireless communication device) comprising circuitry/logic or performing methods according to any of the embodiments. The electronic apparatus may, for example, be a portable or handheld mobile radio communication equipment, a mobile radio terminal, a mobile telephone, a base station, a base station controller, a pager, a communicator, an electronic organizer, a smartphone, a computer, a notebook, a USB-stick, a plug-in card, an embedded drive, or a mobile gaming device.

Figure 1:
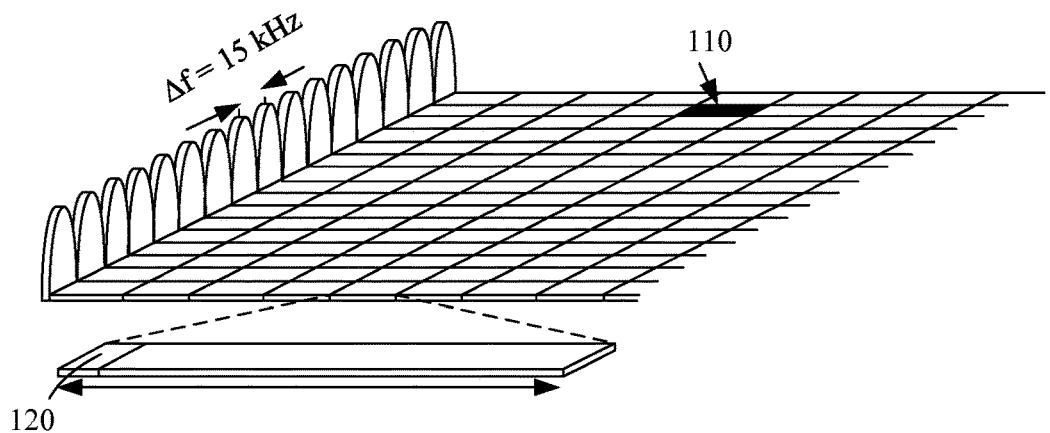
FIG. 1 is a schematic drawing illustrating an LTE downlink physical resource.
Figure 2:
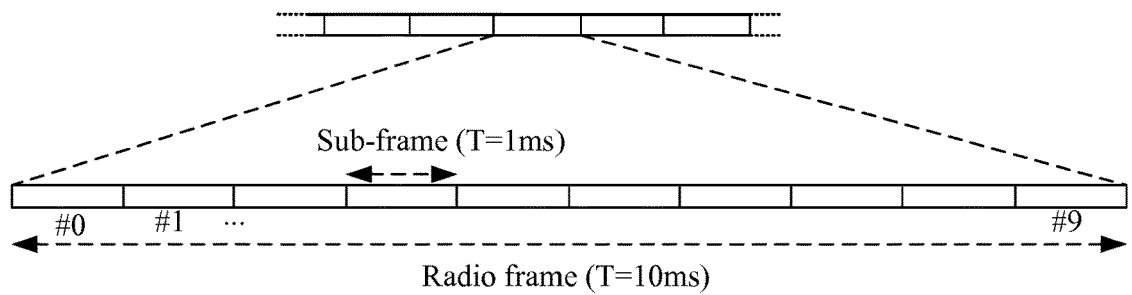
FIG. 2 illustrates an LTE time-domain structure.
Figure 3:
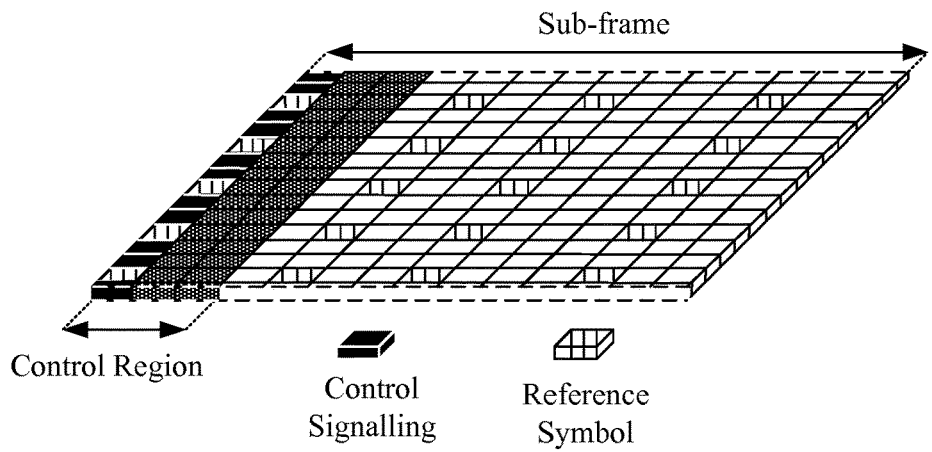
FIG. 3 illustrates a normal downlink subframe.
Figure 4:
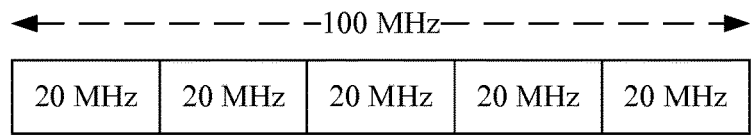
FIG. 4 is an illustration of carrier aggregation.
Figure 5:
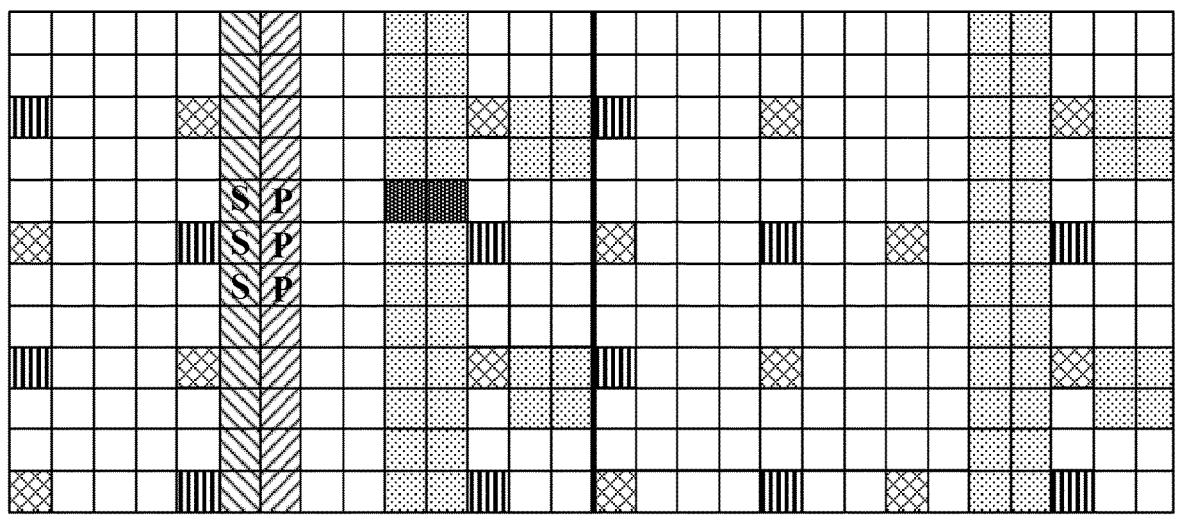
FIG. 5 is an illustration of small cell overview of on/off via SCell activation/deactivation.
Figure 5:
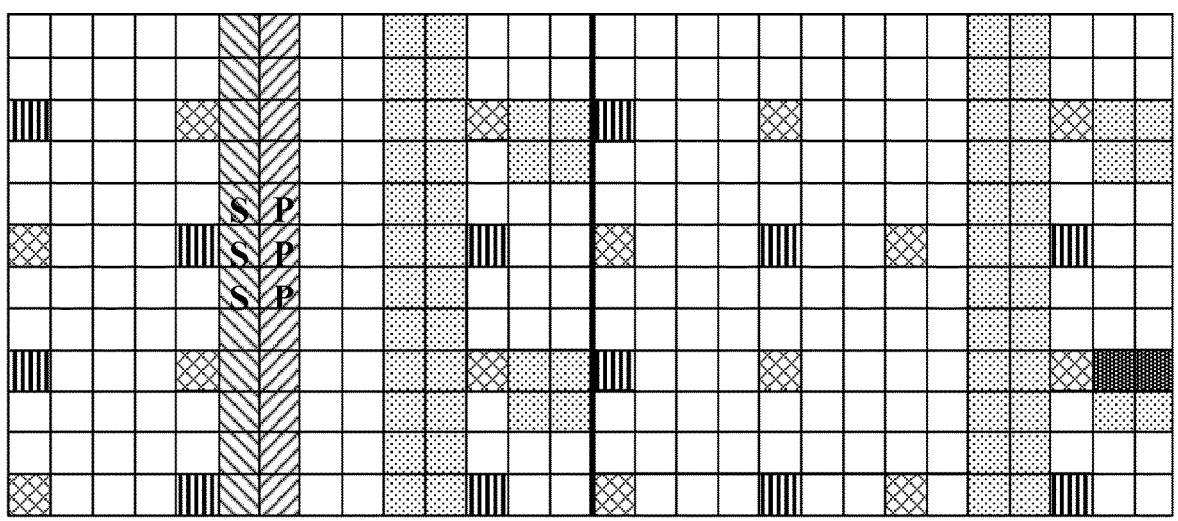
Figure 6:
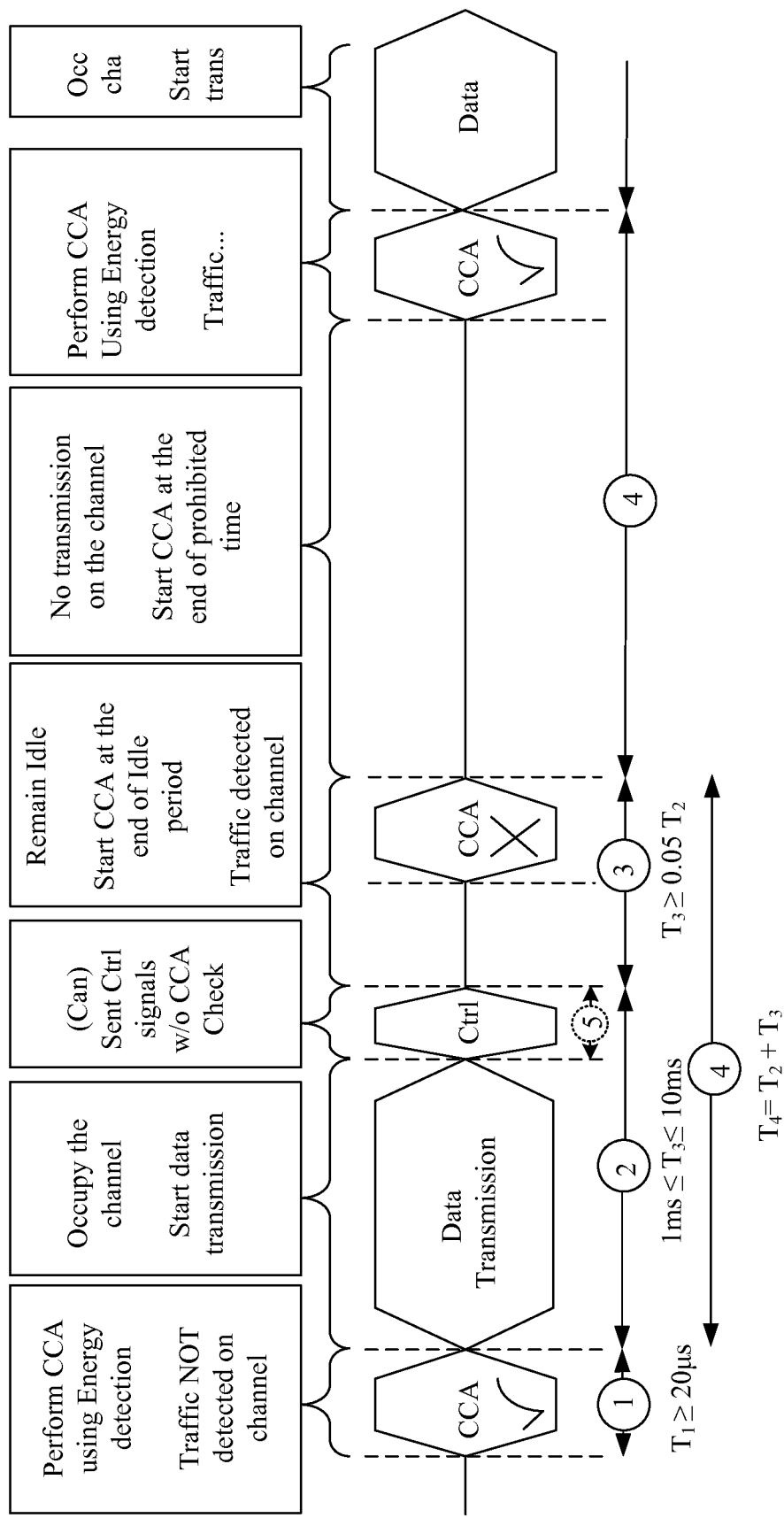
FIG. 6 is a schematic drawing illustrating a Listen Before Talk procedure.
Figure 7:
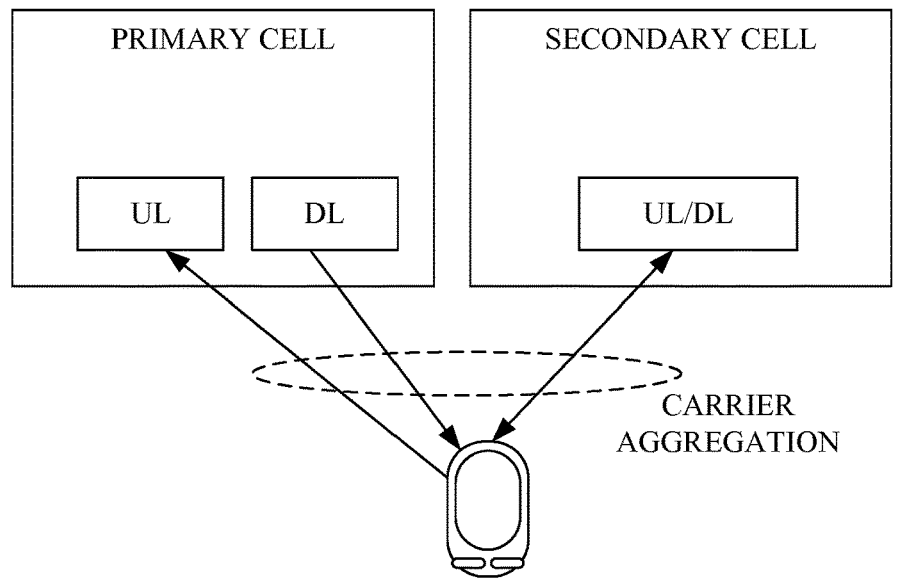
FIG. 7 is a schematic drawing illustrating Licensed-assisted access (LAA) to unlicensed spectrum using LTE carrier aggregation.
Figure 8:
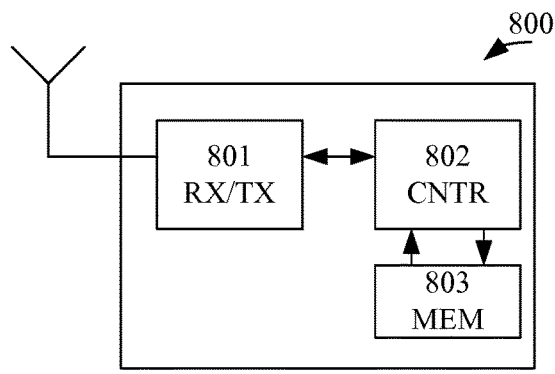
FIG. 8 is a schematic drawing illustrating an example arrangement for use in a user equipment according to some embodiments.

FIG. 8 illustrates an example arrangement for use in a user equipment (UE) for implementing a method as taught herein according to some embodiments. The UE 800 comprises a transceiver (RX/TX) 801, a controller (CNTR) 802, and a memory 803 MEM. The transceiver 801 may in some embodiments be a separate transmitter and a separate receiver. The controller 802 is configured to receive and transmit data through the transceiver, which data may be stored in the memory 803, and to execute any of the methods taught herein.

Figure 9:
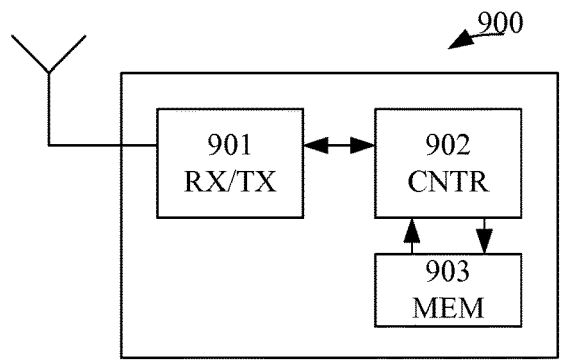
FIG. 9 is a schematic drawing illustrating an example arrangement for use in a base station according to some embodiments.

FIG. 9 illustrates an example arrangement for use in a base station eNB according to some embodiments. Example eNB 900 comprises a transceiver (RX/TX) 901, a controller (CNTR) 902, and a memory (MEM) 903. The transceiver 901 may in some embodiments be a separate transmitter and a separate receiver. The controller 902 is configured to receive and transmit data through the transceiver, which data may be stored in the memory 903, and to execute any of the methods taught herein.

In some embodiments, the example eNB 900 may be an arrangement of a network node for changing a frequency of a first original cell, wherein the original cell is configured to operate at a first frequency. The one or more wireless communication devices are served by the original cell, and the network node is configured to control a plurality of other cells.

If the original cell for some reason no longer provides sufficient resources so that it no longer can support the one or more wireless communication devices that is attached to it, the network node may determine that the original cell may need a change of frequency. In order to realize this, the controller 902 may be configured to cause the network node to select one or more second frequency of an unlicensed spectrum that the network node should switch the original cell to, determine a second cell on the selected second frequency as target cell and cause the target cell to maintain the same neighbor cell relations as the original cell.

The target cell may e.g. be configured with the same neighbor list and network parameters as the original cell.

The controller 902 is further configured to cause the network node to move the one or more wireless communication devices from the original cell to the target cell, turn off the original cell when the one or more wireless communication device have been moved from the first cell to the target cell and inform all neighbor cells of the original cell of the frequency change to the selected one or more second frequency.

Thus, the wireless communication devices will always be connected to a cell, which leads to that network performance is kept on an overall high level, and carrier aggregation is as much as possible maintained.

In some embodiments, the arrangement may comprise means to turn on a new cell.

In some embodiments, the arrangement may further comprise means to reconfigure an already existing cell.

In some embodiments, the controller 902 is further configured to inform the wireless device by means of dedicated signaling. The controller 902 may e.g. cause the transceiver 901 to signal the wireless device.

In some embodiments, the arrangement may further comprise dedicated signaling means configured to perform a hand over. The dedicated signaling means may e.g. be a RRCConnectionReconfiguration message.

In some embodiments, the arrangement may further comprise dedicated signaling means to perform a connection release with re-direct. The dedicated signaling means may e.g. be a RRCConnectionRelease message.

In some embodiments, the controller 902 is further configured to inform the wireless device using broadcast and paging messages. The controller 902 may e.g. cause the transceiver 901 to broadcast a paging message to all wireless communication devices controlled by the eNB.

The controller 902 may further be configured to cause determination of whether there are other active cells among the plurality of other cells controlled by the network node that can continue to be operated with. If such is the case the controller 902 may further cause determination of the target cell by selecting one or more such active cells as target cell.

For instance, a cell may be continued to be operated with, i.e. maintained on the same frequency, if it provides acceptable network performance. The signal quality may e.g. be good, latency low etc.

However, in some embodiments, the network node may determine that one or more cells has to be turned off and or have their frequency changed, but there is no spare capacity to create a new cell. In such case, the network node is already operating with a maximum number of cells.

Thus, in some embodiments, the controller 902 may further be configured to cause determination of the target cell by causing the determination of whether the network node controls a maximum number of cells. If such is the case the controller 902 may cause moving of the one or more wireless communication device from the original cell to one or more of the plurality of other cells and turning off of the original cell. The controller 902 may further cause determination of the target cell on the selected one or more second frequency by creating a new cell operating in the selected one or more second frequency and moving the one or more wireless communication device from the plurality of other cells to the target cell.

Thus, a cell frequency change can be made even though the node controls a maximum number of cells, since the devices are moved to the other cells prior to turning off the original cell. When the original cell has been turned off, a new cell may be created and then be configured as the target cell having the same neighbor configurations as the original cell.

However, if more than one of the cell, or all of the cells controlled by the network node has to be turned off, then in some embodiments, the controller 902 may further be configured to cause determination of whether the network node controls a maximum number of cells and determine whether all of the cells has to be turned off (they may e.g. not provide sufficient signal quality or the network is to be restarted or the like). If such is the case the controller may be configured to cause the move of the one or more wireless communication device from the original cell to one or more of the plurality of other cells and the turning off of the original cell. The controller 902 may also cause determination of the target cell on the selected second frequency by creating a new cell operating in the selected second frequency and moving the one or more wireless communication device from the plurality of other cells to the target cell and the turning off the plurality of other cells.

Moving the devices from the plurality of other cells may be made in steps, where a new cell is created and some of the devices are moved to this cell, then another cell is created and another group of devices are moved, until no devices are served by the old cells anymore so that they may be turned off.

The controller 902 may further be configured to cause determination of whether there is a sufficient amount of free capacity to create the target cell. If such is the case the controller may cause creation of the target cell and cause the eNB to refraining from turning off the original cell until the target cell is created.

If there is a sufficient amount of capacity to create a new cell as target cell, then there may be no need to first move the devices to the other cell controlled by the network node.

In some embodiments, the controller may further be configured to cause moving of the one or more wireless communication device from the original cell by causing determination of whether the one or more wireless communication device is in Radio Resource Control—RRC—Connected state and uses the original cell as Primary Cell. If such is the case, the controller 902 may cause performing of a handover or a release by re-directing or moving the one or more wireless communication device from the original cell to the target cell.

In some embodiments, it may be the secondary cell that needs to have a change of frequency, in such case the controller 902 may further be configured to cause determination of whether the one or more wireless communication device is in RRC Connected state and uses the original cell as Secondary Cell. If such is the case, the controller 902 may cause release of the one or more wireless communication device from the original cell; and configuration of the target cell as new Secondary Cell.

Releasing the devices from the secondary cells means that they are still attached to the primary cell. It may thus not be necessary to create the target cell prior to releasing the devices from the original cell.

The devices may furthermore only be moved when they are in a RRC connected state.

Thus, in some embodiments, the controller 902 may further be configured to cause determination of whether the one or more wireless communication device is in RRC Idle state and uses the original cell as serving cell. If such is the case, the controller 902 may cause paging of the one or more wireless communication device to force it to RRC Connected state and then moving of the one or more wireless communication device from the original cell by causing determination of whether the one or more wireless communication device is in RRC Connected state and uses the original cell as Primary Cell. If such is the case, the controller 902 may cause performing of handover or a release by re-directing the one or more wireless communication device from the original cell to the target cell.

Thus, the network node wakes the device such that it goes from camping on the cell as serving cell in IDLE state to camping on the cell as a primary cell in a Connected state.

The controller 902 may further be configured to cause determination of whether the one or more wireless communication device is in RRC Idle state and uses the original cell as serving cell. If such is the case, the controller 902 may cause moving of the one or more wireless communication device while in RRC IDLE state by causing an update of a system information in the original cell with the target cell's frequency as a neighbor frequency (SIB5), information that the original cell is barred (SIB1) and/or information that intra-frequency cell reselection is not allowed (SIB1). The controller 902 may further cause paging of the one or more wireless communication device to re-read the system information of the original cell.

Thus the device is forced to read the updated information and knows that when it wakes up it should look for the other cell.

The controller may further be configured to cause determination of whether the one or more wireless communication device is in RRC IDLE state and uses the original cell as serving cell, and if so, moving of the wireless communication device while in RRC IDLE state through at least one of dedicated paging messages and broadcast information.

In some embodiments, the arrangement may be of a network node 900 such as an eNB for changing a first frequency of a first original cell, wherein the network node controls a plurality of other cells and wherein one or more wireless communication devices are served by the original cell.

The arrangement comprises a controller 902 configured to cause selection of a second frequency or frequencies on an unlicensed spectrum that the network node should switch the original cell to and determining a second cell on the selected one or more second frequency as target cell.

The controller 902 may also be configured to causing the target cell to maintain the same neighbor cell relations as the original cell and performing a handover or a release by re-directing the one or more wireless communication device from the original cell to the target cell, wherein the handover comprises handover message to the one or more wireless communication device. The handover message may comprise an activation time which may indicate when in time the target cell is available for the one or more wireless communication devices.

The controller 902 may also be configured to cause the network node to turn off the original cell and turning on the target cell on the selected second frequency before the activation time expires and informing one or more neighboring network nodes of the frequency change to the second frequency.

In some embodiments, controller 902 may further be configured to cause the turning off of the original cell on the first frequency and the turning on of the original cell on the second frequency within the activation time.

Thus, the original cell may be turned off prior to turning on the target cell. The one or more wireless communication devices are informed by means of the activation time when in time the target cell will be ready for them, and may thus connect to the target cell when the activation time expires. This makes it possible to release the one or more wireless communication devices from the original cell and let them be unconnected during the activation time. The hand over or redirect is then finished when the activation time has expired and the released devices may connect to the target cell.

Figure 10:
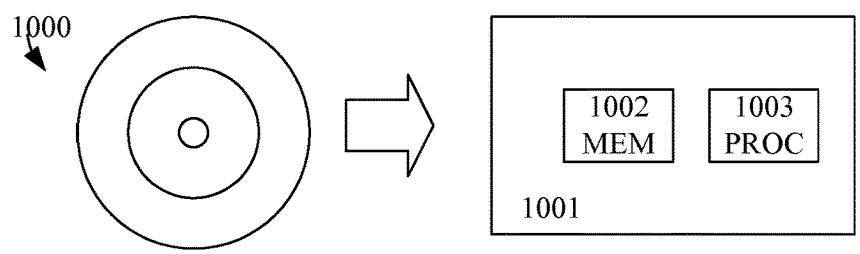
FIG. 10 is a schematic drawing illustrating a computer program product according to some embodiments.

FIG. 10 illustrates an example computer program product program according to some embodiments. According to some embodiments, computer program product comprises a computer readable medium 1000 such as, for example, a diskette or a CD-ROM. The computer readable medium may have stored thereon a computer program comprising program instructions. The computer program may be loadable into a data-processing unit 1001, which may, for example, be comprised in a mobile terminal. The data processing unit

1001 may comprise a memory (MEM) 1002 and a processor (PROC) 1003. When loaded into the data-processing unit, the computer program may be stored in the memory (MEM) 1002 associated with or integral to the data-processing unit 1001. According to some embodiments, the computer program may, when loaded into and run by the data-processing unit, cause the data-processing unit to execute method steps according to, for example, the methods disclosed herein such as those shown in any of the FIGS. 11, 12, 13 and 14, as well as any of the FIGS. 15, 16 and 17

Starting when an eNB, such as the eNB of FIG. 9, shall change frequency of one or multiple cells (original cell) due to detection of high interference in the spectrum, detection of wireless system with higher access priority to the spectrum, or being ordered by an administration system to stop operating on the spectrum. A method executed by the eNB will be disclosed with simultaneous reference to FIG. 11.

The eNB selects 1110 which frequency or frequencies on an unlicensed spectrum that it should switch to and determines 1120 a cell on the selected frequency as target cell. If there are other active cells configured in the same eNB that can continue to be operated with, they can also be selected as target cell. Or, if the eNB is already operating the maximum number of cells that it is capable of, and it has to stop operating on all of these cells, the eNB shall redirect the UEs from one of the cells to the others so the eNB can safely turn off the original cell and create the new target cell on the selected frequency. Or, if there is free capacity in the eNB to create the target cell it is created while keeping the original cell. A target cell is thus determined and the newly created or determined target cell shall maintain 1130 the same neighbor cell relations as the original cell.

The eNB then moves 1140 UEs from the original cell. If the UE is in RRC Connected state and uses the original cell as Primary Cell, the eNB performs handover or a release with re-direct for the UE from the original cell to the target cell, see FIG. 12.

If the UE is in RRC Connected state and uses the original cell as Secondary Cell, the eNB releases the UE from the original cell and configures the target cell as new Secondary Cell.

If the UE is in RRC Idle state and uses the original cell as serving cell, the eNB can either: page the UE forcing it to RRC Connected state and then perform a handover or a release with re-direct for the UE from the original cell to the target cell as in the above; or move the UE while in IDLE using current signaling. Such a move is performed by: first updating the system information in the original cell with: the target cell's frequency as a neighbor frequency (SIB5), information that the original cell is barred (SIB1), and information that intra-frequency cell reselection is not allowed (SIB1), and then page the UE to re-read system information. The eNB may alternatively move the UE while in IDLE using new signaling through e.g. dedicated paging messages and/or broadcast information.

When all UEs are moved the eNB turns off 1150 the original cell and the UEs complete 1170 the handover procedure on the target cell.

The eNB then informs 1170 all its neighbor cells of the frequency change

As an alternative, the eNB may also be configured to utilize an activation time, by 1110 selecting which frequency or frequencies on an unlicensed spectrum that it should switch to and then 1140 move UEs from the original cell.

If the UE is in RRC Connected state and uses the original cell as Primary Cell, the eNB performs handover for the UE from the original cell to the target cell. The handover message includes an activation time indicating when in time the new cell is available for the UE. This gives the eNB time until activation time expires to shut off the original cell and turn it on again on the new frequency.

If the UE is in RRC Connected state and uses the original cell as Secondary Cell, the eNB releases the UE from the original cell and configure the target cell as new Secondary Cell.

If the UE is in RRC Idle state and uses the original cell as serving cell, the eNB can either: page the UE forcing it to RRC Connected state and then perform a handover or a release with re-direct for the UE from the original cell to the target cell as in the above but with an activation time.

The newly created target cell shall maintain 1130 the same neighbor cell relations as the original cell and the UEs complete the handover procedure 1160 on the target cell and the eNB shall inform 1170 all its neighbor cells of the frequency change.

Figure 11:
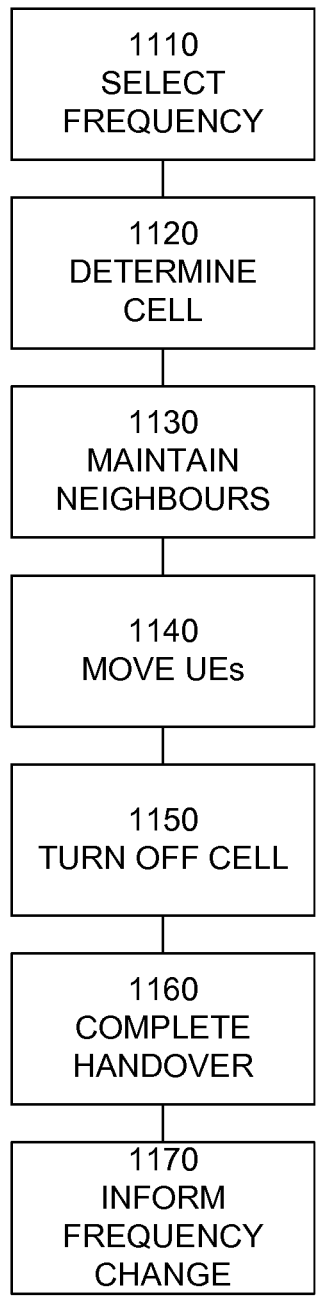
FIG. 11 is a flow chart showing a method according to one embodiment of the teachings disclosed herein.

In some embodiments, the method of FIG. 11 may e.g. be a method of a network node for changing the frequency of a first original cell, wherein the network node controls a plurality of other cells. The method of FIG. 11 may e.g. begin with the network node selecting 1110 a second frequency or frequencies on an unlicensed spectrum that the network node should switch the original cell to.

The network node may e.g. be an eNB and may determine that the original cell needs to be shut off due to e.g. inferior signal quality at the original cell, congestion, signal interference, change of network topology etc.

When a second frequency has been selected the network node determines 1120 a second cell on the selected second frequency as target cell. The network node may cause 1130 the target cell to maintain the same neighbor cell relations as the original cell.

The network node may e.g. configure the target cell with the same network parameters as the original cell. Thus, the target cell will function as the original cell, but on a different frequency.

When the target cell has been determined the network node may move 1140 the one or more wireless communication devices from the original cell to the target cell.

Thus it is made sure that the communication devices always are connected to at least one cell which leads to less probability that the network performance will be negatively affected.

The network node may turn 1150 off the original cell when the one or more wireless communication devices has been moved from the original cell to the target cell; and may inform 1170 one or more neighboring network nodes of the frequency change to the second frequency.

The step 1160 may in some embodiments be omitted from the method of FIG. 11.

By informing the neighboring network nodes of the frequency change, it is ensured that all neighboring cells which may have some connection to the original cell is informed that the frequency of the original cell has been changed.

Figure 15:
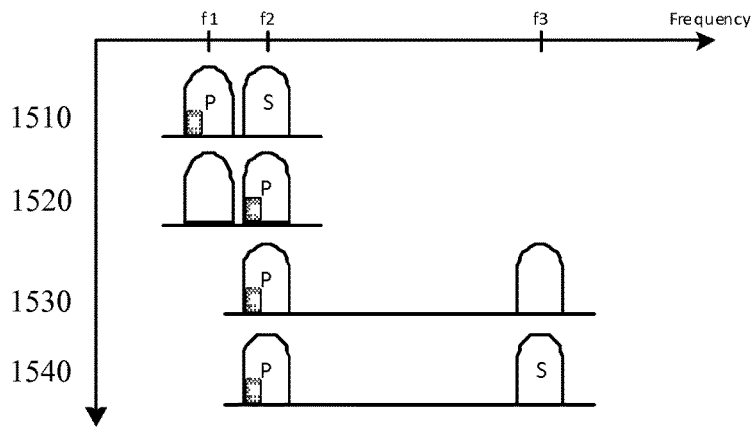
FIG. 15 is a schematic drawing illustrating the frequency change according to one embodiment of the teachings disclosed herein.

In some embodiments, the network node may further determine if there are other cells among a plurality of cells which are controlled by the network node that may still be used for operation, i.e. may not need to be shut down. If so, the network node may determine the target cell by selecting one or more of the other cells. This is further illustrated in FIG. 15. FIG. 15 may in some embodiments correspond to FIG. 12.

In FIG. 15 the X-axis denotes frequency and the Y-axis denotes time, or steps to be taken during a cell frequency shift.

In step 1510 a primary cell (P) is operating on a first frequency f1, and a secondary cell (S) is operating on a second frequency f2.

The network node may determine that the primary cell needs to be shut off but that the secondary cell still can be operated with. The Network node may then in step 1520 configure the secondary cell to be primary cell, and move all UEs to the new primary cell (compare to method step 1140 of the method of FIG. 11). Then the network node may shut of the original primary cell. During this time the capacity of the UEs and network performance may be slightly affected since normal operation may be carrier aggregation, and during the move it will be single carrier.

However, in step 1530 the network node may have determined a second frequency f3 on which to start or create a new cell (compare with 1120 of FIG. 11). The new cell may then be configured as secondary cell to the UEs of the primary cell and carrier aggregation is again enabled.

A cell frequency change has been made without affecting network performance since the UEs always are connected to a cell.

The above scenario may e.g. be beneficial if the network node is controlling a maximum number of cells and does thus not have the capability to create new cells. Then if one cell needs to be shut down, the wireless communication devices can first be moved to another existing cell prior to shutting down the first cell. When the first cell has been shut off, a new cell can be created so that carrier aggregation is maintained.

Figure 13:
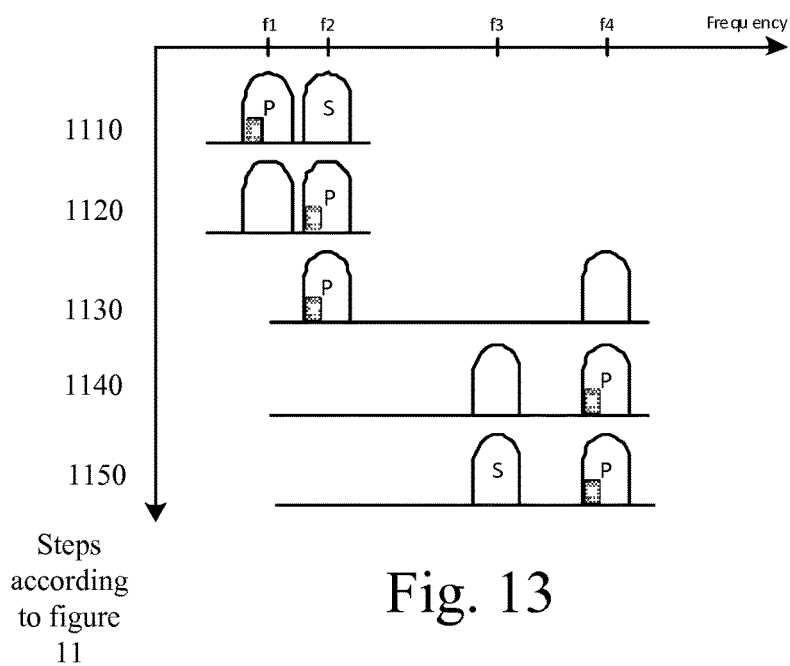
FIG. 13 is a schematic drawing illustrating the frequency change according to one embodiment of the teachings disclosed herein.
Figure 14:
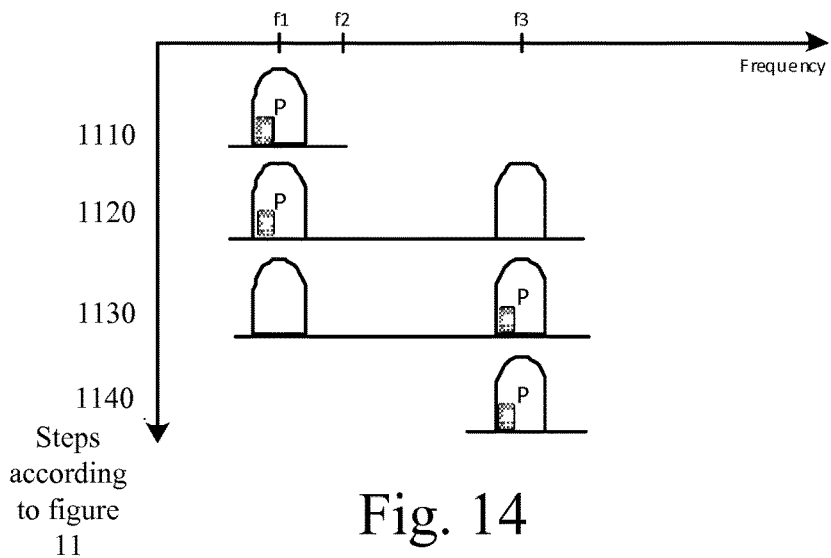
FIG. 14 is a schematic drawing illustrating the frequency change according to one embodiment of the teachings disclosed herein.
Figure 16:
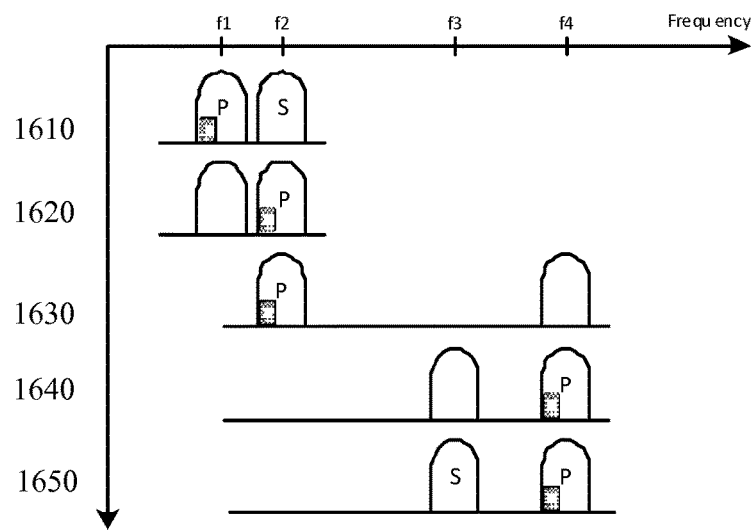
FIG. 16 is a schematic drawing illustrating the frequency change according to one embodiment of the teachings disclosed herein.

FIG. 16 illustrates a method according to some embodiments when the network node determines that all of its current cells need to be turned off FIG. 16 may in some embodiments correspond to FIG. 13.

As in FIG. 15, the X-axis denotes the frequency, and the Y-axis denotes time or method steps.

The network node controls a primary cell (P) on a first frequency f1, and a secondary cell (S) on a second frequency f2. In 1610 determines that both the primary cell and the secondary cell needs to be turned off and selects a new frequency for each cell.

Figure 12:
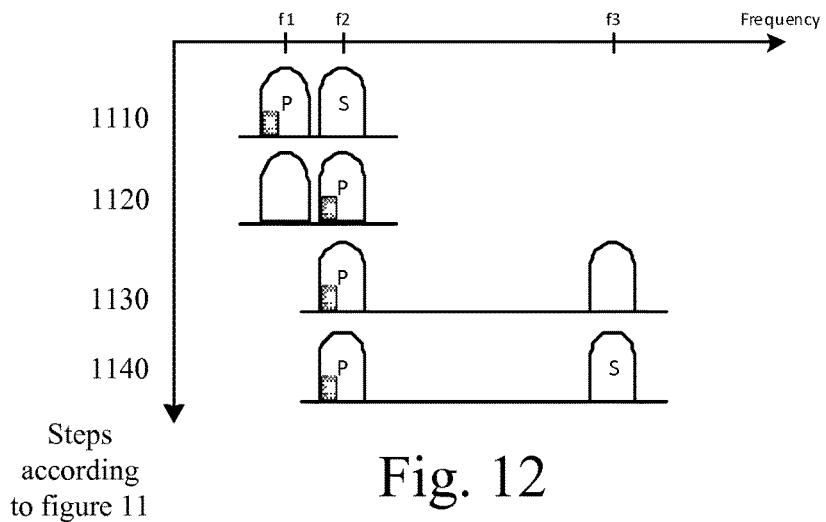
FIG. 12 is a schematic drawing illustrating the frequency change according to one embodiment of the teachings disclosed herein.

In 1620 the secondary cell on frequency f2 is configured to be primary cell and the UEs are moved to new primary cell (compare with FIGS. 12 and 15).

In 1630 the old primary cell on frequency f1 has been shut off, while a new cell is turned on or created on the selected frequency f4 (compare with 1120 in FIG. 11). The new cell may be configured as target cell having the same neighbor relations as the original primary cell on the frequency f1 (compare with 1130 of FIG. 11).

In 1640 the UEs are moved from the primary cell on frequency f2 to the target primary cell on the frequency f4 (compare with 1140 of FIG. 11). A new cell is created on frequency f3 and the former secondary and primary cell on frequency f2 is turned off (compare with 1150 of FIG. 11).

In 1650 the new cell on the frequency f3 is configured as new secondary cell to the primary cell on the frequency f4 so that carrier aggregation may be continued.

Figure 17:
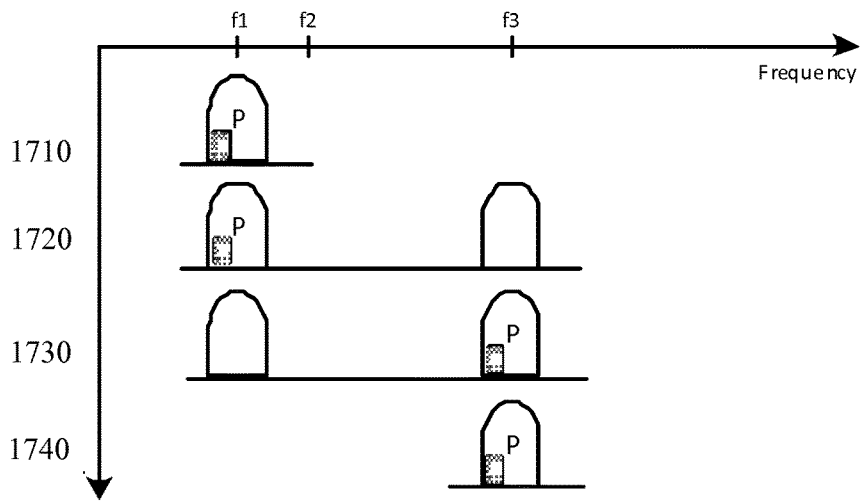
FIG. 17 is a schematic drawing illustrating the frequency change according to one embodiment of the teachings disclosed herein.

In some embodiments, the network node may determine that there is a sufficient amount of free capacity to create or start a new target cell, the procedure which follows after this determination is illustrated in FIG. 17.

FIG. 17 illustrates an example where the eNB has free capacity to create a new cell while keeping an original cell. FIG. 17 may in some embodiments correspond to FIG. 14.

As in FIGS. 15 and 16 the X-axis denotes frequency and the Y-axis denotes time or method steps.

A first original cell is primary cell (P) on a first frequency f1. In 1710 the network node may determine that the original cell needs to be shut off, and may thus select a second frequency which the network node should move the original cell to.

In 1720 a target cell is created on a second frequency f3 (compare with 1120 of FIG. 11). The target cell is configured with the same parameters as the original cell so as to keep the same neighbor relations (compare with 1130 of FIG. 11). The target cell may e.g. be configured with the same cell ID or the same neighbor list or the like.

In 1730 the network node moves the UEs that were served by the original cell to the target cell on the second frequency f3 (compare with 1140 of FIG. 11), and in 1740 when all UEs have been moved, the original cell on the first frequency f1 is shut off (compare with 1150 of FIG. 11).

When moving a wireless communication device, the network node can either initiate a handover to another cell or inform the device that is should move to the other cell.

For instance, the network node may determine if the one or more wireless communication device is in Radio Resource Control—RRC—Connected state and uses the original cell as Primary Cell, and if so, the network node may perform a handover or a release by re-directing the one or more wireless communication device from the original cell to the target cell.

Or, the network node may determine if the one or more wireless communication device is in RRC Idle state and uses the original cell as serving cell. If such is the case, the network node may move the one or more wireless communication device while in RRC IDLE state through the steps of updating a system information in the original cell with the target cell's frequency as a neighbor frequency (SIB5), information that the original cell is barred (SIB1) and/or information that intra-frequency cell reselection is not allowed (SIB1) and paging the one or more wireless communication device to re-read the system information of the original cell.

Thus, when a terminal in idle mode wakes up it will read the new system information and know that it should connect to the cell on another frequency.

A person skilled in the art realizes that the term Primary cell is used for UEs in RRC connected mode, and the term serving cell is used for UEs in RRC IDLE mode, since the UE when in IDLE mode is only connected to one cell. When the UE is in connected mode it may have both a primary and a secondary cell, which both acts as serving cells.

The network node could also, if the wireless communication device is in IDLE state, page the device in order to force it wake up so that a hand over may be performed.

In IDLE state the terminal is typically inactive but does monitor paging and performs measurements on its serving cell and neighboring cells.

In some embodiments, if the original cell is a secondary cell, then the network node may release the wireless communication device from the original cell, and configure the target cell as new secondary cell. In this case it is not crucial that there already exists a new cell when the original cell is shut off, since the wireless device will be connected to a primary cell.

In some embodiments, a handover between cells may be performed with the aid of an activation time. The network node may e.g. transmit a handover message to the one or more wireless communication devices served by a cell, wherein the handover message comprises an activation time indicating when in time the target cell is available for the one or more wireless communication devices.

The network node may then release the UEs even though there isn't a new cell for them to connect to yet. However, the handover message will inform the UEs where there will be a cell ready for them and when.

Thus, the one or more wireless communication device will know when in time there will be a cell ready for it which it may connect to at that time.

In some embodiments, the network node may turn off the original cell and turn it on again on the selected second frequency before the activation time expires. It is to be noted that it is not the exact same cell that is turned on again on the selected frequency, but another cell having the same cell ID, or same network parameters as the original cell.

The activation time enables a handover or redirect without the need of an overlap of cells. This method may e.g. be beneficial if it is not possible to create a new cell in the network while still keeping the old cell, e.g. if maximum capacity has been reached or if the above described method for some reason fails. The network node may for that reason use the activation time if the method as described in conjunction with FIG. 11 for some reason fails.

Then, handover or a release may be performed by re-directing the one or more wireless communication device from the original cell to the target cell with an activation time. I.e. the devices may receive a handover message comprising an activation time, the devices may then be released from the original cell and connect to the target cell on or after the expiry of the activation time.

In some embodiments, the network node may further determine if the one or more wireless communication device is in RRC Connected state and uses the original cell as Primary Cell. If so, the network node may perform handover of the one or more wireless communication device from the original cell to the target cell, wherein the hand over comprises a handover message comprising an activation time indicating when in time the new cell is available for the one or more wireless communication device.

The network node may deactivate the original cell, and activates it again on the selected second frequency before expiration of the activation time.

In some embodiments, the network node may determine if the one or more wireless communication device is in RRC Idle state and uses the original cell as serving cell, and if so page the one or more wireless communication device in order to force it into RRC Connected state and determine if the UE is in RRC Connected state and uses the original cell as Primary Cell. If such is the case the network node may perform handover or a release by re-directing the one or more wireless communication device from the original cell to the target cell with an activation time.

Embodiments

One embodiment relates to a method implemented in a network node for changing the frequency of a cell, the method comprising:
determining a target frequency;
providing a cell on the target frequency;
moving wireless devices from the original frequency to the target frequency;
turning off the cell on the original frequency; and
informing neighbor cells about the frequency change.

One embodiment relates to an arrangement, such as a network node, for changing the frequency of a cell, the arrangement being configured to
determine a target frequency;
provide a cell on the target frequency;
move wireless devices from the original frequency to the target frequency;
turn off the cell on the original frequency; and
inform neighbor cells about the frequency change.

In one embodiment the arrangement further comprises means to turn on a new cell.

In one embodiment the arrangement further comprises means to reconfigure an already existing cell.

In one embodiment of the arrangement the move means are further configured to inform the wireless device using dedicated signaling In one embodiment the arrangement further comprises dedicated signaling means to perform a hand over In one embodiment the arrangement further comprises dedicated signaling means to perform a connect release with re-direct.

In one embodiment of the arrangement the move means are further configured to inform the wireless device using broadcast and paging messages In one embodiment of the arrangement the move is performed within an activation time.

One embodiment relates to a method for use in a node for changing the frequency of a cell, the method comprising:
selecting which frequency or frequencies on an unlicensed spectrum that it should switch to;
determining a cell on the selected frequency as target cell;
causing the target cell to maintain the same neighbor cell relations as the original cell;
moving UEs from the original cell;
turning off the original cell when all UEs are moved;
causing the UEs to complete the handover procedure on the target cell; and
informing all its neighbor cells of the frequency change In one embodiment of the method determining a cell on the selected frequency as target cell comprises
determining if there are other active cells configured in the same eNB that can continue to be operated with, and if so such active cells can also be selected as target cell.

In one embodiment of the method determining a cell on the selected frequency as target cell comprises
determining if a maximum number of cells is already operating on, and if operating on all of these cells has to be stopped, redirecting the UEs from one of the cells to the others so the original cell can safely be turned off and creating the new target cell on the selected frequency.

In one embodiment of the method determining a cell on the selected frequency as target cell comprises
determining if there is free capacity in to create the target cell it is created while keeping the original cell.

In one embodiment of the method moving UEs from the original cell comprises
determining if the UE is in RRC Connected state and uses the original cell as Primary Cell, then performing handover or a release with re-direct for the UE from the original cell to the target cell.

In an embodiment of the embodiment above wherein the handover message includes an activation time indicating when in time the new cell is available for the UE to give the node time until activation time expires to shut off the original cell and turn it on again on the new frequency.

In one embodiment of the method moving UEs from the original cell comprises determining if the UE is in RRC Connected state and uses the original cell as Secondary Cell, then releasing the UE from the original cell and configuring the target cell as new Secondary Cell.

In one embodiment of the method moving UEs from the original cell comprises determining if the UE is in RRC Idle state and uses the original cell as serving cell, then page the UE forcing it to RRC Connected state and then moving UEs from the original cell by determining if the UE is in RRC Connected state and uses the original cell as Primary Cell, then performing handover or a release with re-direct for the UE from the original cell to the target cell.

In one embodiment where the UE is in RRC Idle state and uses the original cell as serving cell, wherein moving UEs from the original cell by determining if the UE is in RRC Connected state and uses the original cell as Primary Cell, then performing handover or a release with re-direct for the UE from the original cell to the target cell is performed but with an activation time.

In one embodiment of the method, moving UEs from the original cell comprises determining if the UE is in RRC Idle state and uses the original cell as serving cell, then move the UE while in IDLE using current signaling through the steps of:

updating the system information in the original cell with: the target cell's frequency as a neighbor frequency (SIB5), information that the original cell is bared (SIB1) and/or information that intra-frequency cell reselection is not allowed (SIB1); and paging the UE to re-read system information.

In one embodiment of the method, moving UEs from the original cell comprises determining if the UE is in RRC Idle state and uses the original cell as serving cell, then moving the UE while in IDLE using new signaling through e.g. dedicated paging messages and/or broadcast information.

In one alternative embodiment the eNB is configured to
select which frequency or frequencies on an unlicensed spectrum that it should switch to,
move UEs from the original cell;
Cause the newly created target cell to maintain the same neighbor cell relations as the original cell;
complete the handover procedure on the target cell; and
inform all its neighbor cells of the frequency change In one embodiment moving the cell comprises determining if the UE is in RRC Connected state and uses the original cell as Primary Cell, the eNB performs handover for the UE from the original cell to the target cell, wherein the handover message includes an activation time indicating when in time the new cell is available for the UE to give the node time until activation time expires to shut off the original cell and turn it on again on the new frequency.

In one embodiment moving the cell comprises determining if the UE is in RRC Connected state and uses the original cell as Secondary Cell, the eNB releases the UE from the original cell and configure the target cell as new Secondary Cell.

In one embodiment moving the cell comprises determining if the UE is in RRC Idle state and uses the original cell as serving cell, and determining if the UE is in RRC Connected state and uses the original cell as Primary Cell, then performing handover or a release with re-direct for the UE from the original cell to the target cell is performed but with an activation time are performed but with an activation time.

The invention claimed is:

1. A method of a network node for changing a first frequency of a first original cell controlled by the network node, wherein one or more wireless communication devices are served by the original cell, and wherein the network node controls a plurality of other cells, the method comprising:

selecting one or more second frequency of an unlicensed spectrum that the network node should switch the original cell to;

determining a second cell on the selected one or more second frequency and controlled by the network node as target cell;

causing the target cell to maintain the same neighbor cell relations as the original cell, including causing the original cell and the target cell to have a same set of neighboring cells;

emptying the original cell of all wireless communication devices by moving the one or more wireless communication devices from the original cell to the target cell;

turning off the original cell when the one or more wireless communication devices have been moved from the original cell to the target cell; and informing one or more neighboring network nodes of the frequency change to the one or more second frequency, wherein determining the second cell on the selected one or more second frequency comprises:

determining if the network node controls a maximum number of cells, and if so, moving the one or more wireless communication device from the original cell to one or more of the plurality of other cells;

turning off the original cell;

determining the target cell on the selected one or more second frequency by creating a new cell operating in the selected one or more second frequency and moving the one or more wireless communication device from the one or more of the plurality of other cells to the target cell.

2. The method according to claim 1, wherein determining the second cell on the selected one or more second frequency comprises:

determining if there are other active cells among the plurality of other cells controlled by the network node that can continue to be operated with, and if so, determining the target cell by selecting one or more such active cells as target cell.

3. The method according to claim 1, wherein determining if the network node controls the maximum number of cells comprises:

determining if the network node controls the maximum number of cells wherein all of the cells have to be turned off, and if so, moving the one or more wireless communication device from the one or more of the plurality of other cells to the target cell comprises moving the one or more wireless communication device from the plurality of other cells to the target cell; and the method comprises turning off the plurality of other cells.

4. The method according to claim 1, further comprising:
determining if there is a sufficient amount of free capacity to create the target cell, and if so
creating the target cell; and
refraining from turning off the original cell until the target cell is created.

5. The method according to claim 1, wherein moving the one or more wireless communication device from the original cell comprises:
- determining if the one or more wireless communication device is in Radio Resource Control (RRC) Connected state and uses the original cell as Primary Cell, and if so,
- performing a handover or a release by re-directing the one or more wireless communication device from the original cell to the target cell.

6. The method according to claim 1, further comprising:
- determining if the one or more wireless communication device is in RRC Connected state and uses the original cell as Secondary Cell, and if so,
- releasing the one or more wireless communication device from the original cell; and
- configuring the target cell as new Secondary Cell.

7. The method according to claim 1, further comprising:
- determining if the one or more wireless communication device is in RRC Idle state and uses the original cell as serving cell, and if so,
- paging the one or more wireless communication device to force it to RRC Connected state and then moving the one or more wireless communication device from the original cell by
- determining if the one or more wireless communication device is in RRC Connected state and uses the original cell as Primary Cell, and if so,
- performing handover or a release by re-directing the one or more wireless communication device from the original cell to the target cell.

8. The method according to claim 1, further comprising:
- determining if the one or more wireless communication device is in RRC Idle state and uses the original cell as serving cell, and if so,
- moving the one or more wireless communication device while in RRC IDLE state through the steps of:
- updating a system information in the original cell with the target cell's frequency as a neighbor frequency, information that the original cell is barred and/or information that intra- frequency cell reselection is not allowed; and
- paging the one or more wireless communication device to re-read the system information of the original cell.

9. The method according to claim 1, further comprising:
- determining if the one or more wireless communication device is in RRC IDLE state and uses the original cell as serving cell, and if so,
- moving the wireless communication device while in RRC IDLE state through at least one of dedicated paging messages and broadcast information.

10. A non-transitory computer readable medium, having thereon a computer program comprising program instructions, the computer program being loadable into a data-processing unit and adapted to cause execution of a method when the computer program is run by the data-processing unit, wherein the method is of a network node for changing a first frequency of a first original cell controlled by the network node, wherein one or more wireless communication devices are served by the original cell, and wherein the network node controls a plurality of other cells, and wherein the method comprises:
- selecting one or more second frequency of an unlicensed spectrum that the network node should switch the original cell to;
- determining a second cell on the selected one or more second frequency and controlled by the network node as target cell;
- causing the target cell to maintain the same neighbor cell relations as the original cell, including causing the original cell and the target cell to have a same set of neighboring cells;
- emptying the original cell of all wireless communication devices by moving the one or more wireless communication devices from the original cell to the target cell;
- turning off the original cell when the one or more wireless communication devices have been moved from the original cell to the target cell; and
- informing one or more neighboring network nodes of the frequency change to the one or more second frequency,
- wherein determining the second cell on the selected one or more second frequency comprises:
- determining if the network node controls a maximum number of cells, and if so,
- moving the one or more wireless communication device from the original cell to one or more of the plurality of other cells;
- turning off the original cell;
- determining the target cell on the selected one or more second frequency by creating a new cell operating in the selected one or more second frequency and moving the one or more wireless communication device from the one or more of the plurality of other cells to the target cell.

11. An arrangement of a network node comprising a controller, for changing a first frequency of a first original cell controlled by the network node, wherein the original cell is configured to operate at a first frequency, wherein one or more wireless communication devices are served by the original cell, wherein the network node is configured to control a plurality of other cells, and wherein the controller is configured to cause the network node to:
- select one or more second frequency of an unlicensed spectrum that the network node should switch the original cell to;
- determine a second cell on the one or more selected second frequency and controlled by the network node as target cell;
- cause the target cell to maintain the same neighbor cell relations as the original cell, including to cause the original cell and the target cell to have a same set of neighboring cells;
- empty the original cell of all wireless communication devices by moving the one or more wireless communication devices from the original cell to the target cell;
- turn off the original cell when the one or more wireless communication device have been moved from the first cell to the target cell; and
- inform all neighbor cells of the original cell of the frequency change to the one or more second frequency,
- wherein the controller is further configured to cause determination of the second cell on the selected one or more second frequency by causing:
- determination of whether the network node controls a maximum number of cells, and if so,
- moving of the one or more wireless communication device from the original cell to one or more of the plurality of other cells;
- turning off of the original cell;
- determination of the target cell on the selected one or more second frequency by creating a new cell operating in the selected one or more second frequency and moving the one or more wireless communication device from the one or more of the plurality of other cells to the target cell.

12. The arrangement according to claim 11, wherein the controller is configured to cause determination of the second cell on the selected one or more second frequency by causing:
 determination of whether there are other active cells among the plurality of other cells controlled by the network node that can continue to be operated with, and if so,
 determination of the target cell by selecting one or more such active cells as target cell.

13. The arrangement according to claim 11, wherein determination of whether the network node controls the maximum number of cells comprises:
 determination of whether the network node controls the maximum number of cells wherein all of the cells have to be turned off, and if so,
 movement of the one or more wireless communication device from the one or more of the plurality of other cells to the target cell comprises movement of the one or more wireless communication device from the plurality of other cells to the target cell; and
 the controller is further configured to cause the network node to turn off the plurality of other cells.

14. The arrangement according to claim 11, wherein the controller is further configured to cause:
 determination of whether there is a sufficient amount of free capacity to create the target cell, and if so
 creation of the target cell; and
 refraining from turning off the original cell until the target cell is created.

15. The arrangement according to claim 11, wherein the controller is further configured to cause moving of the one or more wireless communication device from the original cell by causing:
 determination of whether the one or more wireless communication device is in Radio Resource Control (RRC) Connected state and uses the original cell as Primary Cell, and if so,
 performing of a handover or a release by re-directing the one or more wireless communication device from the original cell to the target cell.

16. The arrangement according to claim 11, wherein the controller is further configured to cause:
 determination of whether the one or more wireless communication device is in RRC Connected state and uses the original cell as Secondary Cell, and if so,
 release of the one or more wireless communication device from the original cell; and
 configuration of the target cell as new Secondary Cell.

17. The arrangement according to claim 11, wherein the controller is further configured to cause:
 determination of whether the one or more wireless communication device is in RRC Idle state and uses the original cell as serving cell, and if so,
 paging of the one or more wireless communication device to force it to RRC Connected state and then moving of the one or more wireless communication device from the original cell by
 determination of whether the one or more wireless communication device is in RRC Connected state and uses the original cell as Primary Cell, and if so,
 performing handover or a release by re-directing the one or more wireless communication device from the original cell to the target cell.

18. The arrangement according to claim 11, wherein the controller is further configured to cause:
 determination of whether the one or more wireless communication device is in RRC Idle state and uses the original cell as serving cell, and if so,
 moving of the one or more wireless communication device while in RRC IDLE state through by causing:
 update of a system information in the original cell with the target cell's frequency as a neighbor frequency, information that the original cell is barred and/or information that intra-frequency cell reselection is not allowed; and paging of the one or more wireless communication device to re-read the system information of the original cell.

19. The arrangement according to claim 11, wherein the controller is further configured to cause:
 determination of whether the one or more wireless communication device is in RRC IDLE state and uses the original cell as serving cell, and if so,
 moving of the wireless communication device while in RRC IDLE state through at least one of dedicated paging messages and broadcast information.

20. A network node comprising the arrangement according to claim 11.

* * * * *